A. C. ROSENBROOK.
NUT LOCK.
APPLICATION FILED SEPT. 12, 1912.
1,060,790.
Patented May 6, 1913.
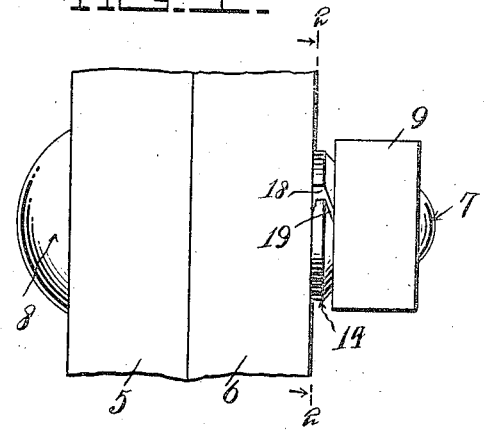
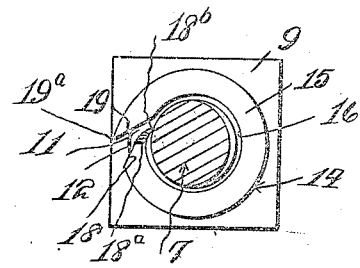
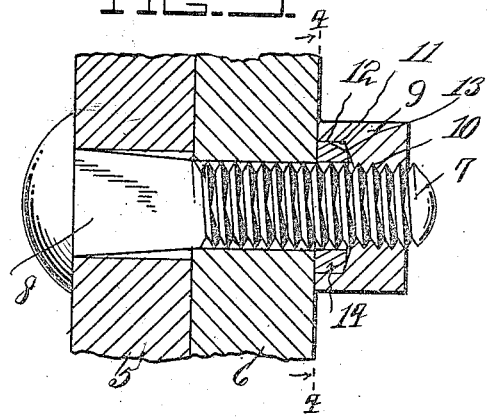
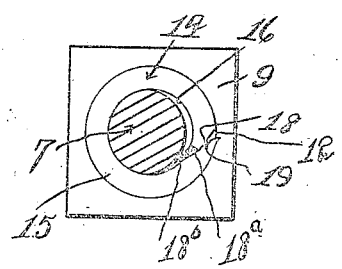
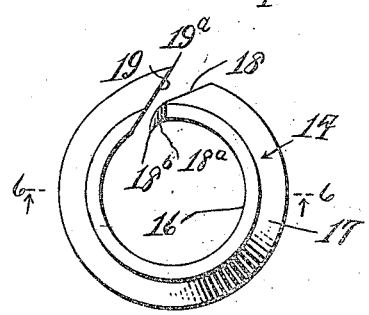
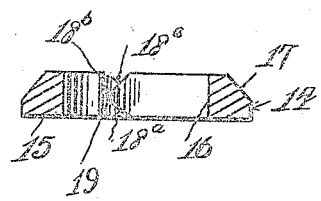
Witnesses
Inventor
A. C. Rosenbrook.
By
Attorneys

UNITED STATES PATENT OFFICE.

AUGUST C. ROSENBROOK, OF WALL, SOUTH DAKOTA.

NUT-LOCK.

1,060,790.    Specification of Letters Patent.    Patented May 6, 1913.

Application filed September 12, 1912.    Serial No. 720,003.

*To all whom it may concern:*

Be it known that I, AUGUST C. ROSENBROOK, a citizen of the United States, residing at Wall, in the county of Pennington, State of South Dakota, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks.

The principal object of the invention is to provide a novel means for locking a nut upon a bolt whereby said nut will be prevented from becoming accidentally loosened.

Another object of the invention is to provide a nut lock which includes a locking member adapted upon screwing home of the nut to tightly engage both the bolt and nut and thereby prevent the latter from becoming accidentally loosened.

A further object of the invention is to provide a nut and locking member which may be readily applied to any bolt of a size to be engaged by said nut without altering the construction of the bolt in any particular.

A still further object of the invention is to provide a nut lock of the character described which is extremely simple in construction, it being composed of a minimum number of parts, and is therefore cheap to manufacture.

With these and other objects in view, the invention consists in the construction and novel combination of parts hereinafter fully described, illustrated in the accompanying drawing and pointed out in the claim hereto appended; it being understood that various changes in the form, proportion, size and minor details of construction within the scope of the claim may be resorted to without departing from the spirit or sacrificing any of the advantages of the invention.

In the drawing: Figure 1 is a side elevation showing the application of a nut lock constructed in accordance with my invention, and showing the locking member in its inoperative position, Fig. 2 is a cross sectional view taken on the line 2—2 of Fig. 1, Fig. 3 is a longitudinal sectional view showing the parts in their operative positions, the bolt being shown in elevation, Fig. 4 is a cross sectional view taken on the line 4—4 of Fig. 3, Fig. 5 is a plan view of the locking ring, and Fig. 6 is a detail cross sectional view taken on the line 6—6 of Fig. 5.

Like reference numerals designate corresponding parts in all the figures of the drawing.

Referring to the drawing, 5 and 6 designate a pair of opposed inner and outer plates which are respectively formed with alined openings for receiving the threaded shank 7 of a bolt 8. A nut 9 is formed with a threaded bore 10 for engagement with the shank 7 of the bolt, and the inner face of this nut is formed with a counterbore 11 which forms a resultant pocket. The peripheral wall 12 of said counterbore is arranged parallel with the longitudinal axis of the bore 10 of the nut, and the end wall 13 of said counterbore is arranged at an obtuse angle to the peripheral wall 12.

In order to lock the nut 9 to the bolt, there is provided a split ring 14 which is formed from spring metal. This ring is substantially triangular in cross section and includes a flat base 15, a flat inner face 16, the latter being arranged at right angles to the former, and a beveled outer face 17. The ends 18 and 19 of the ring diverge outwardly throughout the beveled face 17 and diverge inwardly throughout the unbeveled portion of the outer face. The inner portion of the end 18 is oppositely beveled, as at 18$^a$—18$^a$ to form a resultant inwardly extending point 18$^b$, said point being disposed within and in spaced relation to the inner periphery or inner face 16 of said ring. The outer portion of the end 19 terminates in a point 19$^a$ which is disposed beyond the outer periphery of said ring.

In practice, the ring 14 is positioned upon the threaded shank of the bolt 8 so that the base 15 will be disposed against the outer plate 6. The nut 9 is then screwed onto the shank 7 so that the pocket formed by the counterbore 11 will receive the ring 14. It will be observed that the width of the ring 14 is such that the inner face 16 thereof will rest upon two or more adjacent threads of the shank 7, and that the point 18$^b$ will extend inwardly between an adjacent pair of threads while the point 19$^a$ of said ring will be disposed beyond the peripheral wall 12 of said counterbore 11. Upon rotation of the nut 9 in the proper direction the end wall 13 of the counterbore will engage the beveled face 17 of the ring, and as a result, the point 18$^b$ will be forced into engagement with the shank 7 of the bolt 8. This will hold the ring 14 against rotation so that upon further rotation of the nut 9 the inner face of said nut will ride over the inclined face 17 of the ring and compress the latter until the point 19$^a$ has been drawn into and engaged with the peripheral wall 12 of the counterbore 11. It will thus be observed that the point 18$^b$ of the ring firmly engages the shank 7 of the bolt and the point 19$^a$ firmly engages the peripheral wall 12 of the nut 9 and thereby locks said nut against accidental reverse rotation and consequent displacement.

What is claimed is:

A nut lock comprising a split ring having the ends beveled in opposite directions to produce sharp penetrating points, one of said points being bent abruptly inwardly of the ring, and the other of said points extending beyond the periphery of the ring and being adapted to be bent abruptly outwardly by retrograde turning of the nut and penetrate the nut radially with respect to said ring.

In testimony whereof, I affix my signature, in presence of two witnesses.

AUGUST C. ROSENBROOK.

Witnesses:
 KARL LURZ,
 S. E. SANDERS.